Sept. 26, 1961  J. E. SOCKE  3,001,637
CONVEYOR MECHANISMS
Filed Dec. 17, 1958  3 Sheets-Sheet 2

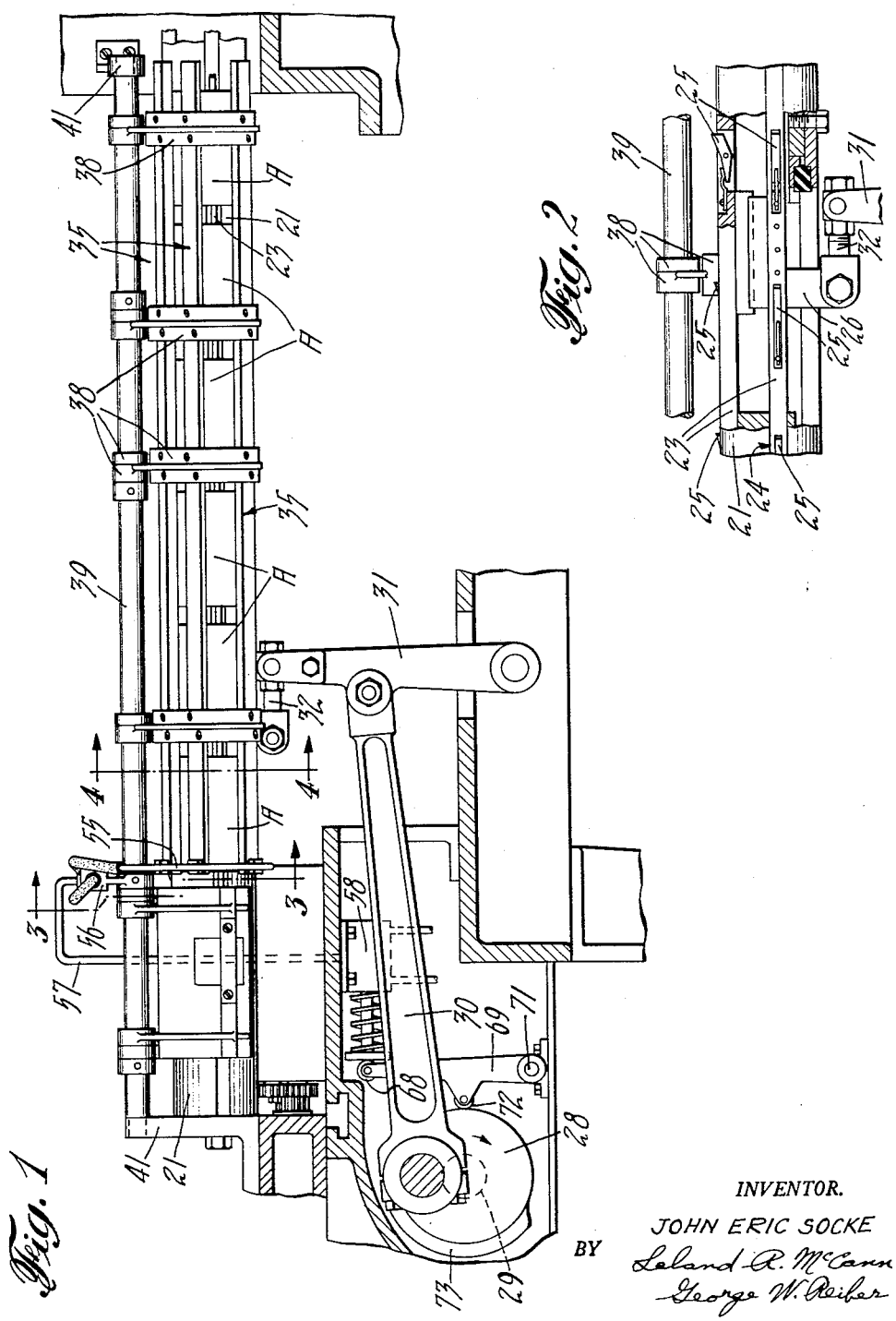

INVENTOR.
JOHN ERIC SOCKE
BY Leland R. McCann
George W. Reiber
ATTORNEYS

Sept. 26, 1961 J. E. SOCKE 3,001,637
CONVEYOR MECHANISMS
Filed Dec. 17, 1958 3 Sheets-Sheet 3
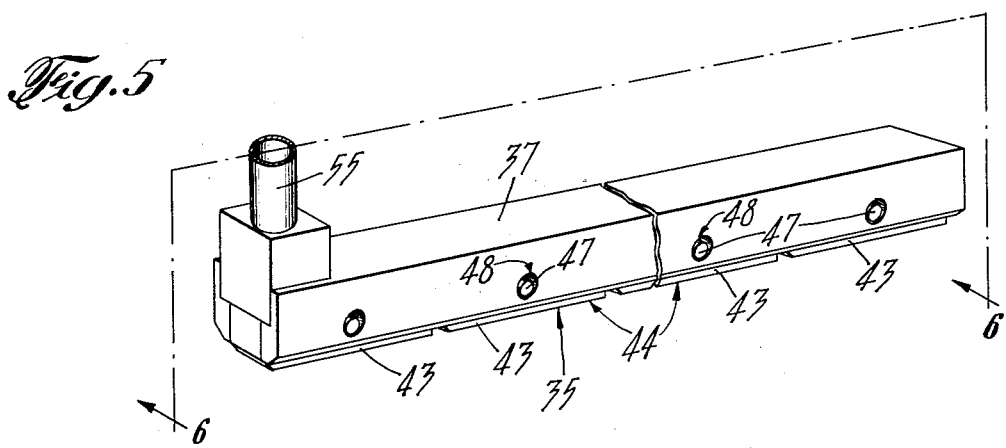
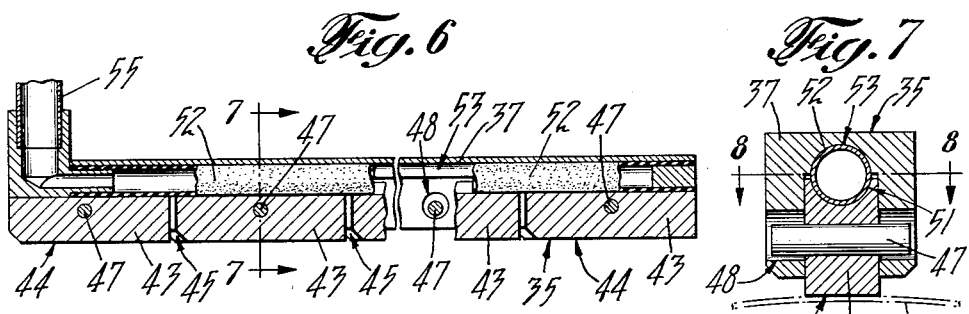
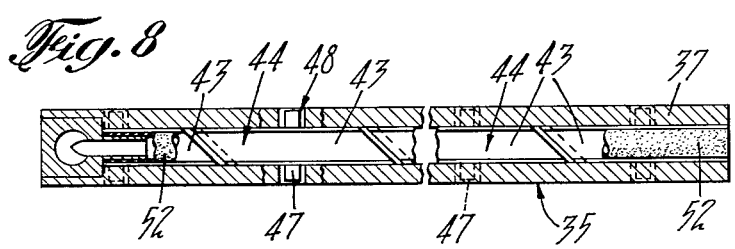
INVENTOR.
JOHN ERIC SOCKE
BY Leland R. McCann
George W. Reiber
ATTORNEYS.
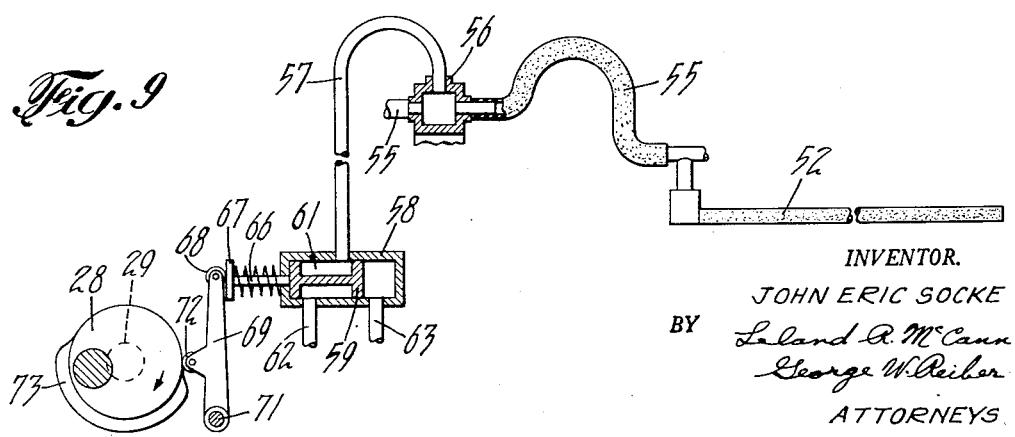

United States Patent Office 3,001,637
Patented Sept. 26, 1961
:::

3,001,637
CONVEYOR MECHANISMS
John Eric Socke, Pelham Manor, N.Y., assignor to American Can Company, New York, N.Y., a corporation of New Jersey
Filed Dec. 17, 1958, Ser. No. 781,031
6 Claims. (Cl. 198—225)

The present invention relates to conveyor mechanisms having pressure devices for retarding advancement of articles fed along a path of travel and has particular reference to instrumentalities for controlling the effective pressure of the pressure devices on the articles.

In the manufacture of sheet metal cans or containers made from flat blanks or tubular members, the can parts, during their fabrication, are often fed in spaced and timed processional relation in a step-by-step or intermittent manner through a plurality of working stations located along a predetermined path of travel. After each step of advancement, the can parts, i.e. the work, preferably is clamped or held in its advanced position by pressure devices which are disposed along the path of travel of the work.

Up to the present time, one of the main limitations to increasing the operating speed of such conveyor mechanisms has been found to be that considerable friction or clamping action must be exerted against the work to bring it to rest at the end of each stepped advancement. When conventional constant pressure spring-backed friction blocks are used as clamping devices it has been found that this constant pressure retards the forward movement of the work at the beginning of the stepped advancement and this results in a severe nicking of the feeding edges of the work.

It is an object of the instant invention to overcome these difficulties by the provision of work holding or pressure devices in which the effective pressure of the devices may be controlled so as to vary the pressure on the work in accordance with the advancement of the work along its path of travel.

Another object is the provision of such pressure devices in which the effective pressure exerted by them may be increased to a maximum at the termination of an advancement of the work and reduced to a minimum at the initiation of an advancement so as to insure a maximum pressure at the required time to hold the work in an advanced position and to further insure free initial advancement of the work to eliminate damage thereto by nicking or other deformation.

Another object is to provide control instrumentalities for such pressure devices to produce variations in the effective pressure exerted by the devices in synchronism with the advancement of the work along the path of travel.

Another object is the provision of such control instrumentalities which transmit fluid pressure to the pressure devices to insure uniformity of pressure simultaneously in a plurality of such pressure devices disposed along the path of travel of the work.

Numerous other objects and advantages of the invention will be apparent as it is better understood from the following description, which, taken in connection with tthe accompanying drawings, discloses a preferred embodiment thereof.

Referring to the drawings:

FIGURE 1 is a longitudinal section of a portion of a can body making machine, illustrating a conveyor embodying the instant invention, parts being broken away.

FIG. 2 is a fragmentary sectional view of a portion of the machine shown in FIG. 1;

FIG. 5 is an enlarged perspective view of a pressure device retainer bar used in the portion of the machine shown in FIG. 1, with parts broken away;

FIG. 6 is a sectional view taken substantially along a plane indicated by the lines 6—6 in FIG. 5, with parts broken away;

FIG. 7 is an enlarged sectional view as taken substantially along the line 7—7 in FIG. 6;

FIG. 8 is a reduced scale sectional view as taken substantially along the line 8—8 in FIG. 7, with parts broken away; and FIG. 9 is a schematic view of pressure control instrumentalities used in the machine.

Figure 3:
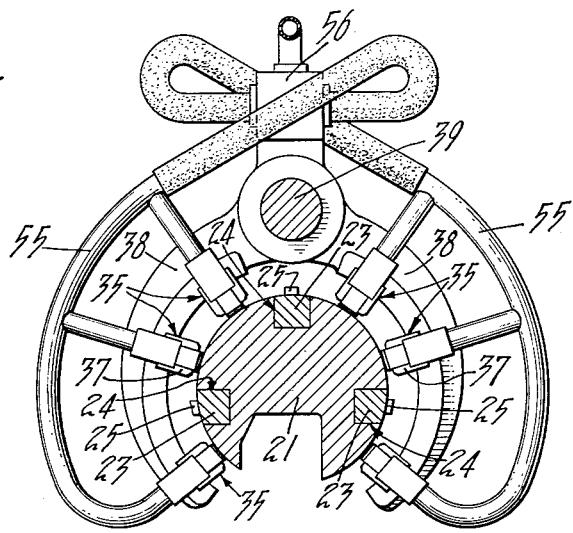
FIGS. 3 and 4 are enlarged transverse sectional views of the machine as taken substantially along the lines 3—3, 4—4 in FIG. 1, parts being broken away.

As a preferred and exemplary embodiment of the instant invention the drawings illustrate principal parts of the feed conveyor section of a can body making machine of the character disclosed in United States Patent 1,625,091 issued April 19, 1927 to J. P. Peters on Can Body Making Machine.

In such a machine, flat, generally rectangular sheet metal (tinplate, black iron or the like) blanks are fed into position adjacent to and are wrapped around a cylindrical horizontally disposed mandrel or horn 21, and are advanced along the horn intermittently into and through a plurality of working stations at which the opposed side seam edges of the partially formed can body (marked A) are notched, folded into reversely bent hooks, interengaged and bumped tightly together in the conventional manner to produce a unitary can body having a locked side seam.

Intermittent advancement of the partially formed can bodies A along the horn 21 preferably is effected by a plurality of reciprocating stroke bars 23 (FIGS. 1, 2, 3 and 4) which slide in longitudinal grooves 24 formed in the horn. The stroke bars 23 carry a plurality of spring-backed, depressible feed dogs 25 which are disposed along the bars at spaced intervals for propelling engagement behind the trailing edges of the can bodies on the horn for the intermittent advancement of the bodies therealong in the conventional manner. Three such stroke bars 23 are shown in the drawings and they are all tied together by an end block 26 (FIGS. 2 and 4) for reciprocation in unison.

Figure 4:
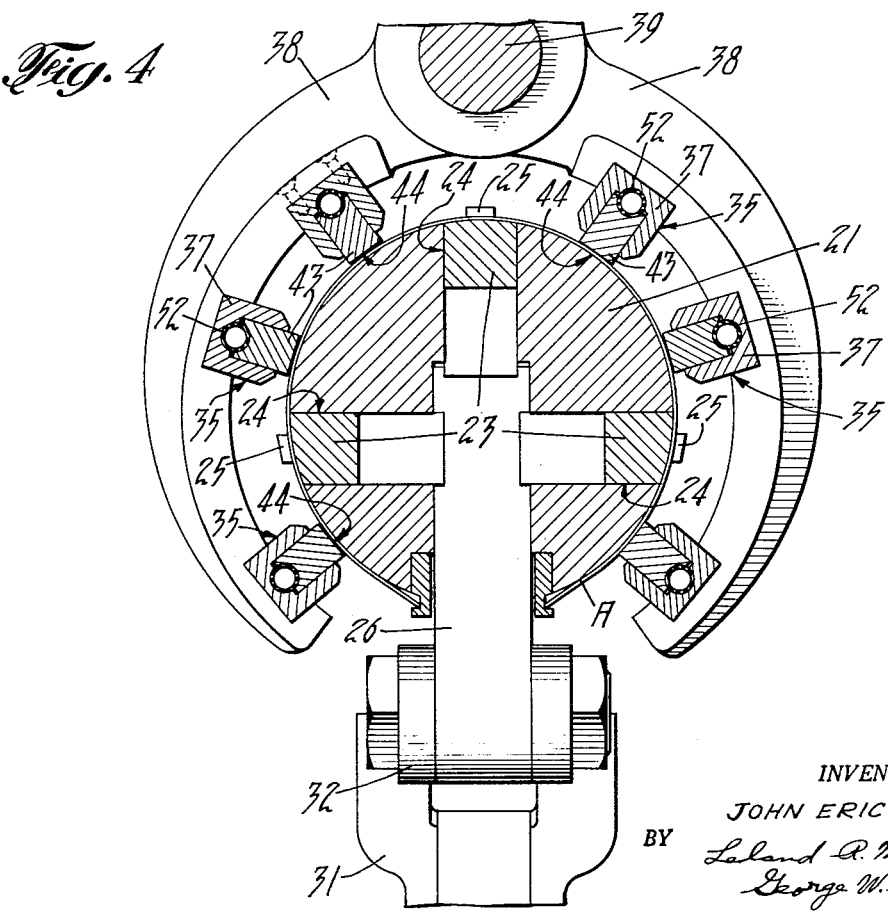

Reciprocation of the stroke bars 23, preferably is effected by an eccentric 28 (FIG. 1) which is mounted on a drive shaft 29 journalled in the machine and continuously rotated as shown in the above mentioned Peters Patent 1,625,091. The eccentric 28, through a connecting rod 30, rocks a pivotally mounted upright arm 31, through a feeding stroke (toward the right in FIG. 1) and thence through a return stroke (toward the left in FIG. 1). The upper end of the arm 31 is connected by a link 32 to the stroke bar end block 26 as shown in FIGS. 2 and 4 and thus through this connection the feed bars 23, in unison, are reciprocated through a feeding stroke (toward the right in FIG. 1) and thence through a return stroke.

On a feeding stroke, the feed dogs 25 engage behind the trailing edges of the spaced apart can bodies A on the horn and advance the bodies one step i.e. the length of the stroke; the length of the body, plus the space between bodies. At the termination of this stroke, the advanced bodies are clamped tightly against the horn to hold them in their advanced position to prevent their return with the feed dogs when the backs of the dogs engage and are depressed under the leading edges of the advanced can bodies during the return movement of the stroke bars.

The clamping of the can bodies in their advanced positions is effected by improved pressure devices 35 (FIGS.

4, 5, 6, 7 and 8) which are an important feature of this invention and which are located adjacent the path of travel of the can bodies along the horn 21. There are a plurality of these pressure devices 35 preferably arranged around the outer face of the horn, between the stroke bars 23. By way of example, the drawings show six of these pressure devices 35 (see FIGS. 3 and 4).

Each of the pressure devices 35 preferably comprises an elongated channel shaped retainer bar 37 (FIGS. 4, 5, 6, 7 and 8) which extends along the horn 21 in radial relation thereto and in parallelism therewith. There are six of these retainer bars 37 as shown in FIG. 4. These retainer bars are secured to pairs of cooperating wings 38 which curve around the horn 21 and which, at their upper ends above the horn, are pivotably mounted on a stationary shaft 39 secured at its ends in brackets 41 attached to stationary frame parts of the machine as shown in FIG. 1.

Within its channel, each retainer bar 37 carries a plurality of elongated, substantially rectangular pressure blocks or shoes 43 having pressure faces 44 which engage against the outer surface of the horn 21 for the passage of the wall of a can body A therebetween. The leading edges of the faces 44 of these pressure blocks 43 are beveled or chamfered as at 45 (FIG. 6) to facilitate advancement of the can bodies along the horn without interference with the blocks. For this same purpose, the ends of the blocks are disposed in contiguous relation with adjacent ends transversely beveled and in parallelism so that the blocks, in any one retainer bar, provide an elongated sectional pressure element having a substantially continuous pressure face engaging against the horn 21. Each pressure block 43 is loosely disposed in its retainer bar 37 against displacement therefrom by a pin 47 transversely secured in the block, with its ends extending beyond both sides thereof and projecting into clearance holes 48 in the side walls of the retainer bar 37 as shown in FIG. 7.

The inner faces of the pressure blocks 43 i.e. the faces disposed adjacent the bottom of the channel in the retainer bars 37, preferably are formed with a curved seat 51 (FIG. 7) which extends longitudinally of all of the blocks 43 in any one retainer bar. These curved seats 51 support a long flexible, inflatable pressure tube 52 disposed between the pressure blocks 43 and the bottom of the channel in the retainer bar 37. The retainer bars 37, at the bottoms of the channels therein, preferably are provided with curved seats 53 to accommodate the tube 52.

The pressure tubes 52 preferably are made of a flexible material such as rubber, polyethylene or the like and extend the full length of the retainer bar 37. There is one pressure tube for each retainer bar. One end of each tube is closed. The opposite end of each tube is connected by a pipe 55 (FIGS. 3, 5, 6 and 9) to a coupling 56 which in turn is connected by a pipe 57 to an air valve, preferably a slide valve having a housing 58.

The slide valve housing 58 contains a reciprocable slide valve 59 having a recess 61 which normally and in the position of the valve as shown in FIG. 9, forms a passageway from the end of the pipe 57 to a vent pipe 62 disposed in the housing and leading to the outside atmosphere. In this same position of the valve, one end of the valve i.e. the end at the right in FIG. 9, closes off a portion of the housing 58 which is maintained under fluid pressure effected by communication with a pipe 63 secured in the housing and leading from a suitable source of fluid under pressure, such as compressed air or other suitable pressure medium.

In the operation of the machine, as when can bodies are being advanced along the horn 21, in step-by-step manner, by the feed dogs 25 on the reciprocating feed bars 23, the slide valve 59 is retained in the position shown in FIG. 9 during the forward stroke of the feed bars. During this stroke, the feed dogs 25 engage behind the can bodies and move them along the horn the full length of the stroke as mentioned hereinbefore. During this stroke also, the pressure tubes 52 of the pressure devices 35 are open to the vent pipe 62 in the slide valve housing 58. Hence no pressure is exerted on the pressure blocks 43, and hence no pressure is exerted against the walls of the can bodies advancing between the pressure blocks and the horn 21.

However, at the termination of the forward stroke of the stroke bars 23, when the can bodies are brought to rest in their advanced position and before the stroke bars 23 start to move back through their return stroke, the slide valve 59 is shifted toward the right as viewed in FIG. 9 to disconnect the pipe 57 from communication with the vent pipe 62 and to establish communication with the fluid pressure pipe 63. Fluid pressure from the pipe 63 immediately enters the pipe 57 and the connecting pressure tubes 52 and thus inflates the tubes. This inflation of the pressure tubes 52 exerts a pressure on the pressure blocks 43 and thus presses the blocks against the walls of the can bodies and clamps the bodies tightly against the horn 21. The can bodies are thus held against movement while the stroke bars move back through their return stroke.

Upon the completion of the return stroke of the stroke bars 23, the slide valve 59 is shifted toward the left into the position shown in FIG. 9. This movement of the slide valve 59 cuts off communication between the pipe 57 and the fluid pressure pipe 63 and reestablishes communication between the pipe 57 and the vent pipe 62 as shown in FIG. 9. This results in a venting and deflation of the pressure tubes 52 and hence effects a dissipation of the pressure on the pressure blocks 43. The can bodies, thus are freed from any retarding pressures to facilitate their further advancement without damage upon the next forward or feeding stroke of the stroke bars 23.

In order to effect the exertion and the release of the pressure on the pressure tubes 52 and hence the pressure blocks 43 and the can bodies A, at the proper time, the shifting of the slide valve 59 is synchronized with the feeding and return strokes of the stroke bars 23. For this purpose, the slide valve 59 is provided with a stem 66 (FIG. 9) which extends outside of the valve housing 58 and carries an actuating head 67. The head 67 preferably engages against a roller 68 carried on the upper end of an upright arm 69 which is mounted at its lower end on a pivot shaft 71 mounted in the machine near the drive shaft 29. Intermediate its ends, the arm 69 carries a cam roller 72 which rides on the outer periphery of the eccentric 28 mounted on the drive shaft 29. This periphery of the eccentric 28 is provided with an edge cam section 73 which is located in relation to the cycle of operation of the eccentric to properly synchronize the operation of the slide valve 59 with the actuation of the stroke bars 23.

In this manner the pressure is controlled to exert a maximum force against the can bodies after an advancement to hold them in place against return with the stroke bars and to relieve the pressure to a minimum during the feeding stroke of the bars to effect free movement of the can bodies to an advanced position, without damage or distortion.

It is though that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making sheet material articles, a support for the articles, feeding means adjacent said support for engaging and intermittently moving the articles in step-by-step advancement and in spaced and timed processional order along a predetermined path on the support, and a pressure device disposed adjacent said support, said pressure device including an elongated retainer bar spaced from and extending along said path of the articles on said support, said retainer bar being provided with a plurality of pressure blocks slidably mounted therein each having a pressure face projecting from said bar toward said support for engagement with the articles in said path, an inflatable tube confined between said blocks and said retainer bar, and means for inflating and deflating said tube in time with said intermittent movement of the feeding means for uniformly distributing yieldable pressure to each of said blocks and for alternately clamping said articles against said support to keep them stationary at rest intervals and for relieving the pressure on said articles during the intervals at which they are advanced by said feeding means to protect said articles against damage by said feeding means.

2. In a machine for making sheet material articles, a cylindrical mandrel for supporting articles such as sheet metal can bodies, a plurality of stroke bars mounted longitudinally in said mandrel and having a plurality of feed dogs for propelling engagement behind said can bodies, means for actuating said stroke bars intermittently to effect step-by-step advancement of the articles, a plurality of elongated retainer bars disposed around said mandrel and extending longitudinally thereof and carrying a plurality of pressure blocks in end-to-end relation in said bars and in radial relation to said mandrel, and means for exerting a fluid pressure against said blocks in time with the stepped advancement of said mandrel to produce a clamping action against said articles while they are at rest between their stepped advancement and to relieve the pressure on said articles during their advancement to protect said articles against damage by said feeding means.

3. A machine of the character defined in claim 1 wherein leading edges of said pressure faces of the blocks are beveled and leading ends of said blocks are transversely beveled to facilitate advancement of the articles along said support.

4. A machine of the character defined in claim 1 wherein there is provided a valve connected to said tube, and means for actuating said valve in time with the travel of the articles along said support for alternately admitting fluid under pressure to inflate said tube and venting the tube to deflate it.

5. A machine of the character defined in claim 2 wherein said retainer bars are channel shape and said pressure blocks are loosely retained in said retainer bars by pins extending transversely through said blocks and projecting into clearance holes in the sides of said retainer bars and wherein there is provided an inflatable tube disposed in each retainer bar between said retainer bar and said blocks for exerting said fluid pressure on said blocks.

6. A machine of the character defined in claim 5 wherein said tubes in said retainer bars are connected with an air valve, and wherein there is provided means actuated in time with the reciprocation of said stroke bars to open and close said air valve to inflate and deflate said tubes.

References Cited in the file of this patent

UNITED STATES PATENTS

| | | |
|---|---|---|
| 2,559,369 | Phillips | July 31, 1951 |
| 2,787,465 | de LaMotte | Apr. 2, 1957 |
| 2,791,978 | Nordquist et al. | May 14, 1957 |